(12) United States Patent
Barbato et al.

(10) Patent No.: US 11,351,549 B2
(45) Date of Patent: Jun. 7, 2022

(54) ULTRASOUND TEST METHOD, AND RELATED TEST DEVICE AND WELL PLATE

(71) Applicant: Gaetano Barbato, Rome (IT)

(72) Inventors: Gaetano Barbato, Rome (IT); Gian Luca Scoarughi, Rome (IT); Cristiano Corso, Palermo (IT)

(73) Assignee: Gaetano Barbato, Rome (IT)

( * ) Notice: Subject to any disclaimer, the term of this patent is extended or adjusted under 35 U.S.C. 154(b) by 135 days.

(21) Appl. No.: 16/979,990

(22) PCT Filed: Oct. 15, 2018

(86) PCT No.: PCT/IB2018/057966
§ 371 (c)(1),
(2) Date: Sep. 11, 2020

(87) PCT Pub. No.: WO2019/077465
PCT Pub. Date: Apr. 25, 2019

(65) Prior Publication Data
US 2021/0354125 A1    Nov. 18, 2021

(30) Foreign Application Priority Data
Oct. 16, 2017  (IT) ................. 102017000116380

(51) Int. Cl.
| | |
|---|---|
| *B01L 3/00* | (2006.01) |
| *G01N 29/02* | (2006.01) |
| *G01N 29/22* | (2006.01) |
| *G01N 29/28* | (2006.01) |
| *G01N 29/32* | (2006.01) |

(52) U.S. Cl.
CPC ............ *B01L 3/5085* (2013.01); *G01N 29/02* (2013.01); *G01N 29/222* (2013.01); *G01N 29/28* (2013.01); *G01N 29/32* (2013.01); *B01L 2300/0829* (2013.01); *G01N 2291/02466* (2013.01); *G01N 2291/106* (2013.01)

(58) Field of Classification Search
CPC .... B01L 3/5085; G01N 29/02; G01N 29/222; G01N 29/28; G01N 29/32; G01N 2291/106
See application file for complete search history.

(56) References Cited

U.S. PATENT DOCUMENTS

| | | | |
|---|---|---|---|
| 2002/0006361 A1 | 1/2002 | Sanadi | |
| 2006/0158956 A1* | 7/2006 | Laugharn | ................ B01F 11/02 366/127 |
| 2006/0275883 A1 | 12/2006 | Rathgeber et al. | |

FOREIGN PATENT DOCUMENTS

WO        2015110955 A1    7/2015

* cited by examiner

*Primary Examiner* — Tarun Sinha
(74) *Attorney, Agent, or Firm* — Volpe Koenig

(57) ABSTRACT

In a method for performing ultrasound tests which uses a suitable device for performing such tests, a well plate implements an insulation between the different wells of the well plate of such set, without significant ultrasound transmissions in the plate material, wherein a filling material of the accessible spaces outside the wells is provided which do not reflect nor transmit waves in an extent higher than +/−10%.

10 Claims, 4 Drawing Sheets

ULTRASOUND TEST METHOD, AND RELATED TEST DEVICE AND WELL PLATE

FIELD OF THE INVENTION

The present invention generally relates to a well plate, which is arranged to be used in a device for ultrasound tests which is used for testing the effect of ultrasounds with different intensities and frequencies on a plurality of targets, in particular targets of organic and microbiological nature, each one thereof received inside a well of the well plate.

BACKGROUND

As a matter of fact, an application of this type of well plate, which has a characteristic tray-like shape, relates to the use of the above-mentioned device to observe the effect of the interaction between ultrasounds and (prokaryotic or eukaryotic) cell cultures, or between ultrasounds and culture cells wherein a drug was inoculated, such as for example an anti-tumor drug on tumor cells, with the purpose of verifying if the drug effectiveness increases the dosage being equal, or if the effectiveness thereof remains unaltered even if the dosage decreases.

The ultrasounds are also used to stimulate effects such as cell differentiation, activation of phosphorylation pathways, cell regeneration or to induce sonoporation of biological membranes, for translating nucleic acids, proteins, molecules or molecular aggregates, markers (i.e. fluorescent markers, for Imaging with Magnetic Resonance, etc.) inside cells by means of the production of pores of the cell membranes: for all these purposes tests are required.

Then, it is meant that many other applications of ultrasounds can be tested under strictly controlled conditions, even in fields different from insulated cell systems, such as for example in explanted or in vivo tissues, or in fields wherein one is beyond the strictly cell material.

In the applications on cell substrates, samples are housed in the plate wells, whereas the ultrasounds in one application form are generated by transducers immersed in a bath full of liquid, such as for example distilled water at controlled temperature, used as means for transferring the ultrasound vibrations from the transducer to the sample.

According to another known application, the transducers are lowered from the top and the vibrating element is dipped directly within the solution in contact with the cell sample contained in the well [Hensel et. al. 2011, Ultrasound in Medicine and Biology 37, 2105-2115)].

However, whatever the positioning of the transducers with respect to the samples, it cannot be avoided that two characteristic technical problems appear, since they are linked to the well plate wherein the samples are contained.

First, reflection and refraction phenomena can take place caused by the presence of liquid/solid interfaces between the liquid for transferring the acoustic waves or the solution containing the cell samples and the surface made of plastic material of the bottom of the well to be crossed, for example water/polystyrene, and liquid/air between the solution containing the cell samples and the air above the well [Kinoshita M. and Hynynen K. 2007, Biochem. Biophys. Res. Comm. 359, 860-865; Hensel et. al. 2011, Ultrasound in Medicine and Biology 37, 2105-2115]. Moreover, phenomena of converting ways for transmitting the acoustic waves through the materials, such as stationary waves, Rayleigh waves, Stoneley waves, Scholte waves, Lamb waves etc., can take place [Rose J. L. Ultrasonic waves in solid media, UK Cambridge University Press, 2004].

The reflected waves cross the sample, by creating constructive and destructive interference phenomena with the longitudinal wave front, thus by generating a substantial anisotropy of the acoustic intensity locally inside the sample, by creating hot spots wherein the interference is constructive and depression points wherein instead it is destructive (Kopechek J. A. et al 2010, Ultr. Med. & Biol. 36, 1762-1766; Hensel et. al. 2011, Ultrasound in Medicine and Biology 37, 2105-2115), by making difficult to reproduce an experiment.

The mode for converting waves transmits through the plastic material thereof the plate is made, whereas the main conversion source is represented by the well bottom which is portion of a planar laminar surface which joins all wells, but even by the plastic material of the well which assumes the characteristic cup-shaped shape and which rises with an angle of about 90° with respect to the bottom. Moreover, the wells are joined, in one single stiff set, by a thin small tongue or septum having a thickness of about 1 mm made of the same plastic material, and oriented at 90° with respect to the laminar surface constituting the bottom of the plate, and having variable height depending upon the manufacturing house of the plates.

It was demonstrated that, in the bottom of the well which receives the longitudinal beam of ultrasound waves and which includes the sample in cell culture, the impact of the longitudinal acoustic waves produces both stationary waves and different modes of transverse waves propagated through the thickness of the laminar plane: surface Raleygh waves, Stoneley waves and/or Scholte waves and, at last, Lamb waves [Leskinen J. J. and Hynynen K. 2012, Ultrasound in Medicine and Biology, 38, 777-794].

When the beam of longitudinal ultrasound waves, emitted by a transducer, hits a target well, these transverse waves propagate through the solid material of the plate in direction normal to the longitudinal beam, by spreading towards the wells adjacent to the one which receives directly the longitudinal wave.

At last, the side surface of the cup-shaped well, represents another liquid/solid interface and as such it contributes to produce reflection and refraction phenomena by propagating waves in direction normal with respect to the longitudinal acoustic wave generated by the transducers.

In order that the ultrasound test is reliable and repeatable for each plate well, the beam of ultrasounds has not to be subjected to substantial reflections or refractions, due to the crossing of interfaces between liquids at different temperature, between different liquids, between liquid means and gaseous means and so on, nor phenomena of mode conversion in transverse waves propagating at time of sonication by invading adjacent wells should be produced.

In order to keep under control the reflection problem, systems are used for controlling the vibrations' transmission liquid temperature, and generally on the well plate a layer of sound-absorbing material is placed, which prevents to a portion of ultrasounds to be reflected in the bath (Kopechek J. A. et al 2010, Ultr. Med. & Biol. 36, 1762-1766; Gourevich D. et al. 2013, J. Control Release, 170, 316-324). It is to be noted, among other things, that an excess of back reflection could cause serious problems to the transducers.

However, this device does not eliminate the water-air interface which determines above the well plate, however determining a partial reflection and a refraction of the beam of ultrasounds and prevents a reliable adjustment of the energy transmitted to the samples, by creating positive and negative "hot spots", by making the test repeatability uncertain.

Moreover, the samples in the wells have to remain in a sterile environment and they have not to absorb different liquid from the one therein they are dipped, that is usually physiological solution or however an aqueous solution, with a sound transmission speed substantially equal to the one contained in the bath, exactly to avoid interferences in the ultrasound beam. Moreover, in this aqueous solution even minimum amounts of air should not be trapped, which would make difficult the correct execution of ultrasound tests.

Apparently, there are no experimental modes succeeding in eliminating or attenuating significantly the transmission of transverse waves to the side wells.

The technical problem underlying the present invention is to provide an ultrasound test method which uses a specific well plate allowing to obviate the drawbacks mentioned with reference to the known art.

SUMMARY

Such drawbacks are overcome by an ultrasound test method, by a suitably modified well plate and by a related test device defined in the respective enclosed independent claims, the depending claims referring to additional preferred details of the present invention.

The main advantage of the test method with the well plate according to the present invention lies in the fact of implementing an insulation between the several wells, by minimizing the invasion of transverse waves in the adjacent wells and, at the same time, a well plate which is crossed by the beam of ultrasounds without significant reflections which could alter the test itself.

BRIEF DESCRIPTION OF THE DRAWINGS

The present invention will be described hereinafter according to two preferred embodiments thereof, provided by way of example and not for limitative purpose with reference to the enclosed drawings wherein.

DETAILED DESCRIPTION OF THE PREFERRED EMBODIMENTS

Figure 1:
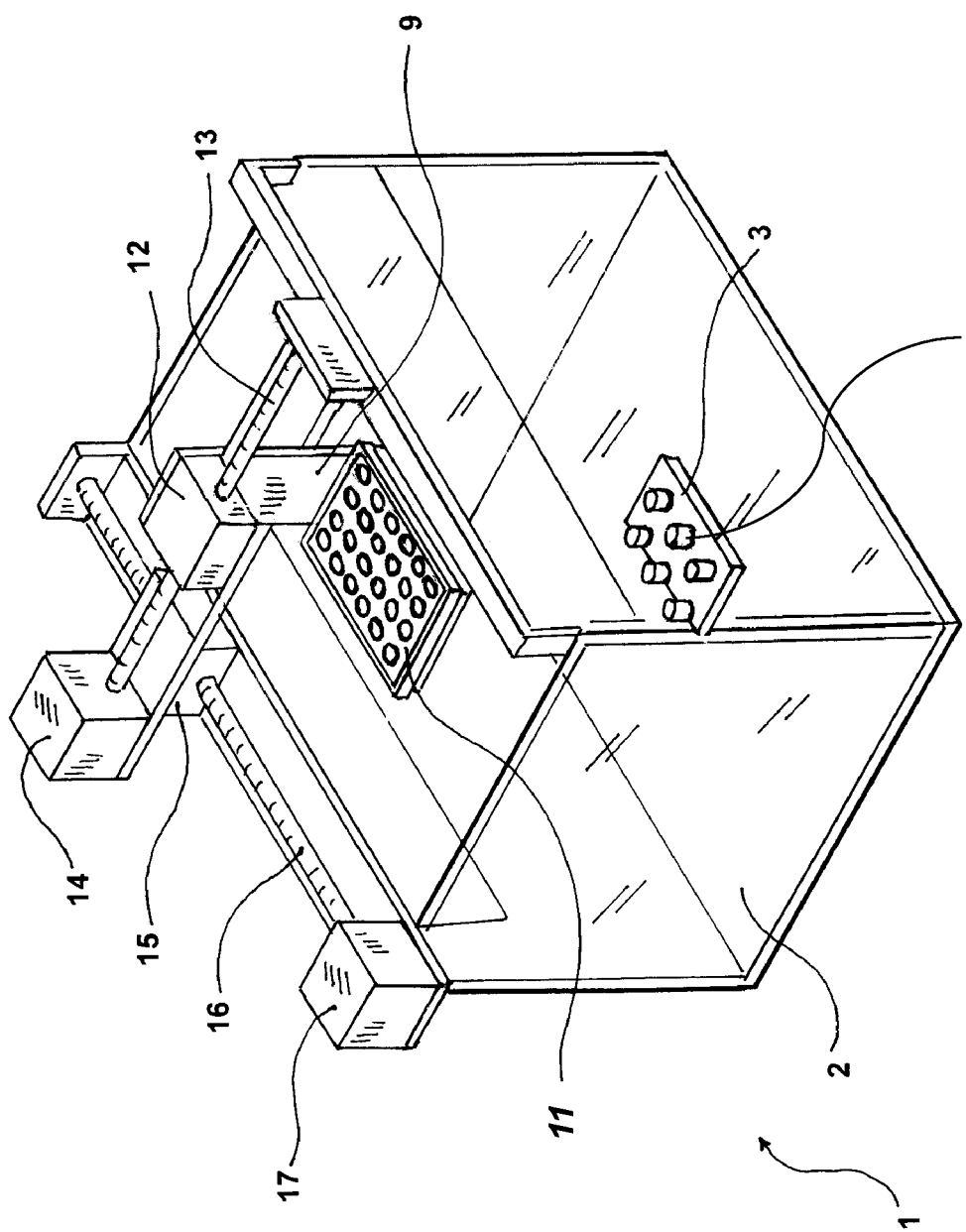
FIG. 1 shows a perspective view of an ultrasound test device incorporating a well plate according to the present invention.

With reference to FIG. 1, a test device for ultrasound applications to specific targets is designated as a whole with 1. In this example, it is provided that a well plate, shaped like a tray, is insonicated from the bottom by one or more ultrasound transducers, but it is meant that different insonication modes can be provided, in particular from the top instead from the bottom.

The test device of the example shown in FIG. 1 comprises a bath 2 delimited by a bottom and by side walls, filled-up with a liquid for the transmission of a beam of ultrasounds, in particular distilled water, the temperature thereof is kept under strict control. In the present embodiment example the bath 2 is implemented with side walls made of glass (or plastics, or metal material), wholly filled-up with water; this, in case of glass or plastic material, allows to view directly the bath content.

Such liquid plays a double function of thermal control element and means for transmitting ultrasound from transducers to respective targets which will be described hereinafter. As far as the ultrasound transmission is concerned, the liquid is degassed and means can be provided to degas this liquid.

From a thermal point of view, the water mass constitutes a relevant thermal inertia with respect to the masses of other existing components; means for keeping such liquid at a controlled temperature, in particular a constant temperature selected based upon the targets to be treated, is provided.

Such means for keeping the temperature can include means for making the liquid to circulate outside the bath 2 wherein a thermostat will be provided; otherwise the thermostat, for example of the type with electric resistances, could be dipped directly in the container in direct contact with the fluid. Such means, for example, could control the liquid for the ultrasound transmission at a physiological temperature, or at a temperature compatible with the samples to be subjected to test.

The device 1 comprises a positioning structure 3 for a number of ultrasound transducers 4 apt to produce each one a beam of ultrasounds. Such transducers could be for example of the piezoelectric type, supplied by a control unit with electric current, that is a multiple radiofrequency signal, with adequate frequency and power.

Figure 2:
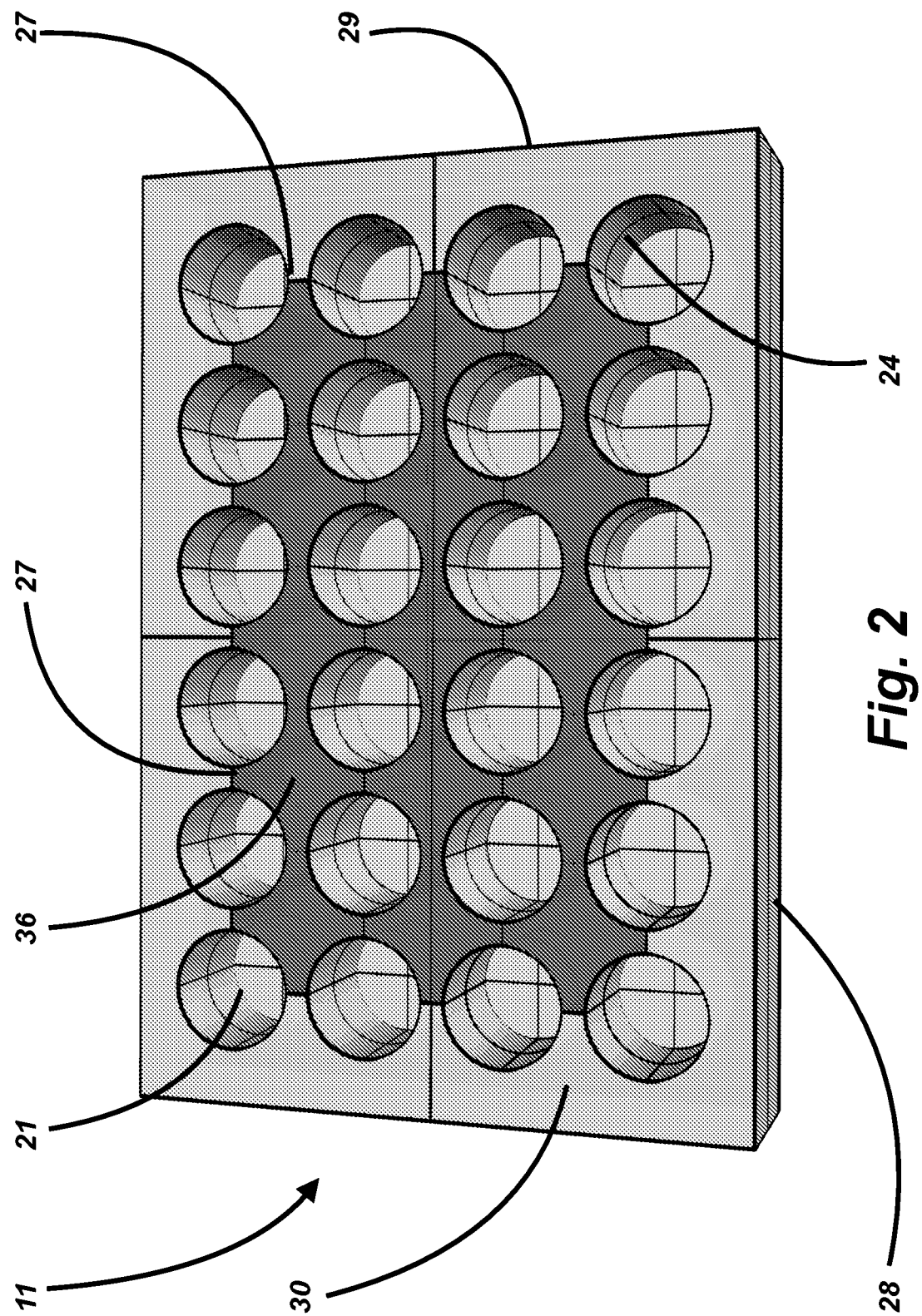
FIG. 2 shows a top perspective view of a well plate arranged for implementing the method according to the invention.
Figure 3:
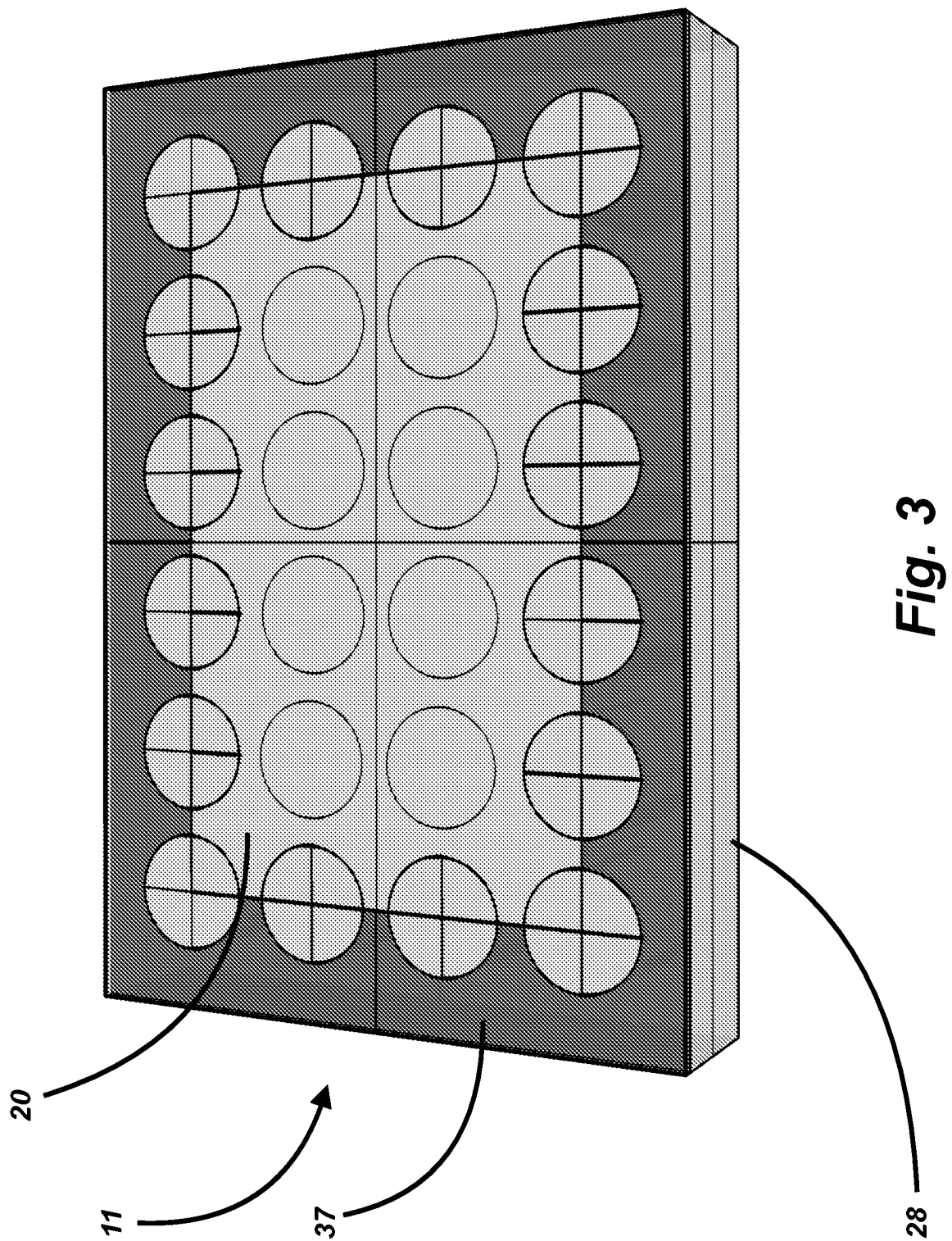
FIG. 3 shows a bottom perspective view of a well plate arranged for implementing the method according to the invention.

The device 1 comprises a structure for supporting a plurality of targets; they are formed inside a container having substantially the shape of a tray, conventionally known in the art as well plate 11 (FIGS. 2 and 3).

The well plate 11 comprises a plurality of well seats, in the present example an array of 4×6=24 wells which constitute as many different targets. It is to be noted that the wells, and thus the targets, are arranged in an array in a multiple number of the number of transducers, in this example 24-6. Moreover, the distances between the centers of adjacent transducers will be multiple of the distances between the adjacent target centers. The plate 11 will be described hereinafter with greater details.

Due to the arrangement of the single wells in the plate, in order to change the targets irradiated by the array of transducers, it will be sufficient to translate the ones or the other ones by the distance between the targets according to axes perpendicular therebetween. This simple translation of one or more pitches, wherein under pitch indeed the minimum distance between the targets is meant, will allow to arrange contemporarily all transducers in front of new targets.

By considering the planar tray-like shape of the plate 11, all targets can be kept at the same height which in case could correspond to a focal plane of the transducers 4, in case one wants to center the focus of a transducer in a precise point inside the target, ideally in the center of the well that is in the heart of the herein contained sample.

Alternatively, if one wishes to make to act the so-called "near" or "far field", one can act by positioning suitably the plane of the plate 11 at a different height along the axis Z, so as to lower or raise, respectively, the position of the plane of the well plate relatively to the focal plane of the transducer which is activated.

On this regard, it is noted that, upon considering the different distances of each transducer existing in the device 1, they could be driven not only with different frequencies and/or different powers, so that on each target a constant power (or an equal acoustic pressure) could be applied for a predetermined period of time, by making the several tests comparable therebetween.

Said structure for supporting the plate 11 then comprises means for translating the targets on the focal plane common to said transducers 4 along perpendicular axes lying on such plane.

On this regard, the plate 11 is supported by a (not shown) framework-like frame fastened to an arm 9 connected to a first cursor 12 assembled along a first screw shaft 13 driven by a first electric motor 14, in turn assembled on a second cursor 15 assembled along a second screw shaft 16 driven by a second electric motor 17, with the screw shafts perpendicular therebetween.

It will be understood that it could be convenient even to use plates with arrays with different sizes, for example larger, with 48 targets (6×8) or 96 targets (8×12), or smaller with six targets (2×3) or twelve targets (3×4).

The well plate has been so far briefly described and it is used according to an ultrasound test method, both of them the present invention relates to, which will be then described with greater details in the following embodiment example.

The herein described method for performing ultrasound tests is performed on a plurality of samples arranged in a well plate, and thus it comprises the step of providing a device for ultrasound test as previously described.

The well plate 11 used in the present example of the present invention comprises a lower floor 20 extending so as to implement the bottom of all wells 21 of the array.

The single well 21 comprises a cavity 22 limited by a bottom 23 and by vertical walls 24, which have a cylindrical or truncate conical profile with the bottom 23 which constitutes the lower base thereof. The well 21 then comprises a top mouth 25 limited by a circular edge 26, which constitutes the top of the vertical walls 24. All bottoms 23 of the wells 21 are implemented in one single piece by means of the lower floor 20, and all mouths 25 lie at an upper plane, all of them at the same level.

The wells 21, which are arranged according to a rectangular array, are spaced apart by the respective adjacent wells. At the vertical line of the outer surface of the vertical walls 24 which represent the nearest points to the corresponding points of the adjacent wells, the plate 11 comprises connecting septa 27 which join the wells in the adjacent points, from the bottom to the top. In this way, the space comprised between four adjacent wells is insulated from the adjacent spaces.

The array of the wells 21 is surrounded by vertical peripheral walls 28 conferring the rectangular shape to the plate 11 and having an upper edge 29. Outside the array of the wells 21, it is joined to the circular edges 26 of the wells 11 arranged on the periphery of the array by means of a peripheral plane 30.

Due to the extension of the lower plane 20 and of the peripheral plane 30, arranged on the opposite faces of the well plate 11, two types of spaces outside the wells 21 are limited, accessible from the bottom and from the top of the plate 11: the spaces accessible from the top 36 are those comprised between the wells 21 inside the array; such spaces have the lower plane 20 which constitutes the bottom thereof. In case of an array with 4×6 wells, the spaces accessible from the top separated by the connecting septa 27 are 3×5=15 (FIG. 2).

On the other hand, the space accessible from the bottom 37 is comprised between the peripheral walls 28 and the wells 21 outside the array, with the connecting septa 27 joining them; such space is one single peripheral space surrounding the array and which has said peripheral plane 30 as top (FIG. 3), or it could be divided into several spaces according to the plate's manufacturer.

In the present example, the well plate 11 is implemented in one single piece, in particular by means of injection molding or punching of a layer made of plastic material, such as polystyrene or polypropylene. These materials are likely to be sterilized by making convenient the use of the plate 11 in "disposable" mode.

The thickness of the lower plane 20 which constitutes the bottom of the wells 21 is so as to interfere, inevitably but even in limited way and causing the technical problems solved by means of the present invention, with a beam of ultrasounds produced by said one or more transducers 4, considering that the lower plane is wet by the transmission liquid of the bath 2.

It is meant however that the well plates are well known to the person skilled in the art and that herein a conventional type thereof is used which provides a reduced interference upon the passage of an ultrasound beam.

In an embodiment of the present invention, and with the purpose of solving the technical problem related to the reflection and refraction phenomena caused by the presence of liquid/solid (liquid for transferring the acoustic waves or solution containing the cell samples/surface of the plastic material of the bottom of the well to be crossed, that is water/polystyrene) and air/liquid (solution containing the cell samples/air above the well) interfaces, the plate 11 is apt to receive on the upper side a lid, designated with 31 (FIG. 4), which has projections 32 are formed so as to insert each one in a respective well 21. On this regard, such projections 32 have outer walls 33 and a top 34 which conjugates with the shape of each well 21.

Figure 4:
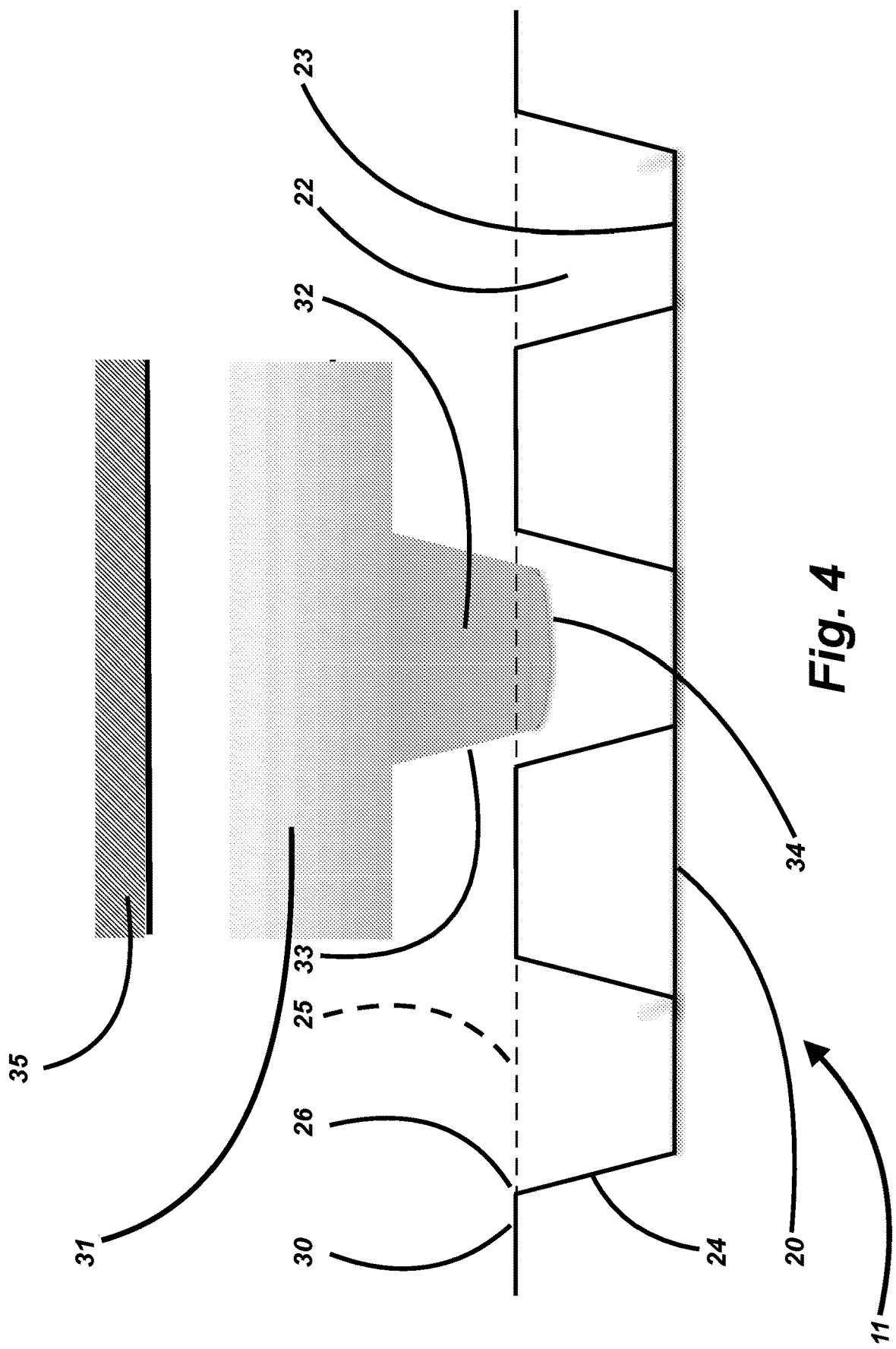
FIG. 4 shows a side, partial and cross view of a detail of the well-holding plate.

The lid 31 extends to cover the whole surface of the plate 11: in FIG. 4 a partial representation of the lid 31 can be seen, in the foreground with one single projection 32, but it is meant that the lid 31 has a projection 32 for each cavity 22.

The projections 32 then rest upon with the solution contained in each well 21 by floating thereon, and by determining a partial re-ascending thereof in the capillary space which implements between the inner walls 24 of the well 21 and the outer walls 33 of the lid 31.

The lid 31 constitutes an example of means for closing said plate wells, which carry out the function of extracting from the content of each well 21 the acoustic waves by preventing the reflection thereof, producing an acoustic coupling between lid 31 and plate 11 which is wholly covered, by wholly covering the well plate 11, being substantially transparent to the passage of a beam of ultrasounds without determining reflections or refractions of great extent, and on this regard, the material constituting said lid 31 has a sound transmission speed which differs from that of the water, that is the one of the transmission liquid in the bath 2, no more than +/−15%, preferably 10%.

To this purpose, the lid can be one single solid piece, for example made of a material selected from the following group: Teflon (PTFE), butyl rubber or polyisocutylene, Adiprene (urethane rubber), Viton rubber (fluorinated rubber), silicone—mentioned by pure way of example—the sound transmission speeds thereof vary from 1300 m/s to 1550 m/s.

Alternatively, the lid 31, by keeping the above-described shape, can have a hollow body limited by one of the above-mentioned materials or by thin walls made of a different material, for example polystyrene. The hollow body can be filled-up with water, or with a liquid the sound speed thereof is similar to that of water, with a maximum variation of +/−10%.

Above the lid 30 a sound-absorbing layer 35 is provided, thus arranged at a certain distance from each well 21 and which functions as dampener of the acoustic wave by absorbing it and preventing the reflection thereof.

According to the present method, the samples to be subjected to test are arranged in the respective wells 21, which are then filled up with a corresponding aqueous solution compatible with the sample itself and which substantially has the same sound transmission speed of the transmission liquid, in case of water 1430-1480 m/s.

By way of example, each well 21 then includes a solution receiving a cell culture which constitute the targets of the ultrasound beam generated by the above-mentioned transducers 4.

The bottom 23 of the wall 21 is dipped in the liquid included in the bath 2, so as to be in thermal contact therewith.

In this example, the cultures could be kept at an almost constant physiological temperature of 37° (or other suitable temperature) during all tests, both during irradiation, and during the waiting periods before and after tests.

In this way, the previously mentioned means for keeping constant the fluid temperature in the bath 2 constitutes also means for keeping said targets at a constant temperature.

According to a different embodiment, the lid 31 is constituted by a liquid layer towering the wells 21 and the content thereof.

On this regard, the well plate 11 forms an open container thus towering the wells 21 without there is a physical barrier separating the two spaces.

Once having finished the arrangement of the targets, the method provides that said open container is filled up with an additional liquid for the ultrasound transmission, by favouring the extraction thereof, thus determining an interface between it and the aqueous solution of each well 21, so that the aqueous solution does not mix with that of other wells and with the additional liquid itself.

In order that the so-filled-up plate 11 does not produce reflection phenomena, the additional liquid for the ultrasound transmission which is added in the open container of the plate 11 has a sound transmission speed which differs from that of the transmission liquid in the bath 2, and thus from that of the solution of the samples, no more than +/−10%.

According to a preferred version, such difference is limited to +/−5%, preferably +/−1%.

In the light of what said above, said liquid for the ultrasound transmission constitutes the means for extracting the acoustic wave from said wells 21 and which insulates the content thereof by wholly covering the well plate 11, having a sound transmission speed which differs from that of the transmission liquid in the bath 2 no more than +/−10%.

In order to implement the above interface, it is possible to arrange on the upper peripheral plane 30, before the filling-up of the above container, a thin water impervious sheet, so that it is wet by the aqueous solution of the wells 21 to guarantee the ultrasound transmission.

In this way, the solution in the wells 21 and the above liquid would be physical separated and such liquid then could be another amount of physiological solution or distilled water, which has a slightly lower density, or a liquid almost immiscible in water, in case always with a lower density than that of the solution wherein the samples are dipped.

According to a variant, said interface is a liquid-liquid interface, determined by the fact that said additional liquid is a liquid substantially immiscible in water and having a lower density.

This variant, however, can provide the presence of said water impervious sheet, to guarantee the perfect separation between the two liquids. Otherwise, it can be provided that the solution fills-up each well only partially, in order that an amount of added liquid forms a protective layer in the well, floating on its aqueous solution, by preventing it from going out therefrom and mixing with that of other wells, all this by performing the filling-up of the open container with due attention and slowness, by avoiding shocks.

Such liquid advantageously can be an inert hydrocarbon substantially immiscible in water, preferably an inert hydrocarbon selected from a group comprising castor oil (1480 m/s), cedar oil (1406 m/s), groundnut oil (1460 m/s), colza oil (1450 ms), transformer oil (1425 m/s) (the respective sound transmission speed is designated in brackets).

In order to guarantee the absence of air and to avoid the formation of meniscuses at the interface, the liquid at issue could have a lower surface tension than that of water, preferably lower than 40.0 mN/m. For example, the castor oil has a surface tension of 36.4 mN/m, whereas that of water is 72.8 mN/m.

In the above-described well plate 11, an amount of liquid for the ultrasound transmission will be provided apt to fill up the open container thereof, with the above-illustrated physical properties.

It is also to be meant that such liquid will be provided under sterile form.

An intermediate variant between the two solutions of above-described closing means can be also provided: each well 21, already filled-up with the organic sample in solution, can be filled-up with a layer of ultrasound transmission liquid as described above, immiscible with water and lighter than it.

Subsequently, the above-described lid 31 is inserted above the well plate 11: in this way the transmission liquid, with reduced surface tension, fills up each possible space between plate 11 and lid 31 by forming a sealing liquid film which is substantially transparent upon the passage of a beam of ultrasounds.

In the embodiment of the present invention shown in FIGS. 2 and 3, with the purpose of solving the technical problem related to the phenomena of converting ways of transmitting acoustic waves through the materials, such as stationary waves, Rayleigh waves, Stoneley waves, Scholte waves, Lamb waves etc., the spaces accessible from the top 36 and from the bottom 37 are filled-up with a material which does not reflect nor transmit acoustic waves.

The filling-up of said spaces takes place so that air gaps or air bubbles do not remain between the filling material and the walls of the plate. The filling material adheres perfectly both to the outer surfaces of the wells 21, and to the flat surfaces of the lower plane 20 and peripheral plane 30. Moreover it adheres perfectly even to the surfaces constituting the walls delimiting the outer periphery of the plate 11.

The filling material is selected so that it has reflective and transmitting capability both lower than 10%, preferably lower than 5%.

To this purpose, and by pure way of example and not for limitative purpose, the material can be a suitable formulation of polyurethane (PU) or silicone.

The material can be conveniently prepared by a liquid mixture having two or more components and in presence of polymerization reaction catalyst which brings it subsequently to solidification. The solidification time should be reasonably long, for example higher than 30 minutes, so as to allow the procedures for degassing the mixture and for pouring in the empty spaces of the plate before solidification takes place.

The material, once prepared the reaction mixture, should also have viscosity features so as to be poured with precision in said empty spaces, 36, 37 without risking the overflowing in the wells 21, or on the lower plane 20 which constitutes the bottom of the plate which has to be crossed by the longitudinal acoustic waves during the experimental step.

A person skilled in the art, with the purpose of satisfying additional and contingent needs, could introduce several additional modifications and variants to what described above, however all within the protective scope of the present invention, as defined by the enclosed claims.

The invention claimed is:

1. A method for performing ultrasound tests on a plurality of samples arranged in a well plate having a plurality of substantially cup-shaped wells and respective accessible spaces outside the wells, the method comprising:
   providing a device for ultrasound tests comprising a bath filled with a liquid for the ultrasound transmission at controlled temperature, one or more transducers arranged at the bottom of said bath, immersed in the transmission liquid, supporting means which supports said well plate at the free surface of the transmission liquid of the bath;
   filling the accessible spaces outside the wells with an insulation material, thereby providing an ultrasound insulation;
   arranging samples to be subjected to test in the respective wells, filled up with a corresponding aqueous solution which substantially has the same sound transmission speed of the transmission liquid in the bath;
   arranging said covering means on the well plate and focusing an ultrasound beam on one or more target samples.

2. The method for performing ultrasound tests according to claim 1, wherein said insulation material comprises polyurethane (PU)- or silicone-based formulation.

3. The method for performing ultrasound tests according to claim 2, wherein the insulation material is prepared from a liquid mixture having two or more components and in presence of polymerization reaction catalyst which brings the liquid mixture subsequently to solidification.

4. The method for performing ultrasound tests according to claim 1, further comprising providing a well plate with a plurality of substantially cup-shaped wells; and means for closing means said wells which insulates the content thereof by wholly covering the well plate and having a sound transmission speed which differs from that of the transmission liquid in the bath by no more than +/−15%, said closing means comprising an additional sound-absorbing layer spaced apart from each well and acting as dampener of the acoustic wave.

5. A well plate for performing ultrasound tests on a plurality of samples, comprising a plurality of wells arranged according to an array and accessible spaces outside the wells, wherein said accessible spaces are filled with an insulation material, thereby providing an ultrasound insulation.

6. The well plate according to claim 5, wherein the insulation material comprises a polyurethane (PU)- or silicone-based formulation.

7. The well plate according to claim 6, wherein the insulation material is prepared from a liquid mixture having two or more components and in presence of polymerization reaction catalyst which brings the liquid mixture subsequently to solidification.

8. The well plate according to claim 5, comprising a lower plane extending so as to define the bottom of each well of the array, the bottoms of the wells being configured in one single piece by means of said lower plane.

9. The well plate according to claim 8, wherein two types of spaces outside the wells are limited:
   a space accessible from the top comprised between the wells inside the array, which have the lower plane which constitutes the bottom thereof;
   a space accessible from the bottom comprised between said peripheral walls and the wells outside the array, with connecting septa joining the top and bottom spaces, which surrounds the array and has said peripheral plane as top.

10. An ultrasound test device comprising a bath filled with a liquid for the ultrasound transmission at controlled temperature, one or more transducers arranged at the bottom of said bath, immersed in the transmission liquid, and supporting means which supports a well plate according to claim 5, the well plate being arranged at a free surface of the transmission liquid of the bath.

* * * * *